US008428390B2

United States Patent
Li et al.

(10) Patent No.: US 8,428,390 B2
(45) Date of Patent: Apr. 23, 2013

(54) GENERATING SHARP IMAGES, PANORAMAS, AND VIDEOS FROM MOTION-BLURRED VIDEOS

(75) Inventors: Yunpeng Li, Ithaca, NY (US); Sing Bing Kang, Redmond, WA (US); Neel Suresh Joshi, Seattle, WA (US); Steven Maxwell Seitz, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 493 days.

(21) Appl. No.: 12/815,264

(22) Filed: Jun. 14, 2010

(65) Prior Publication Data

US 2011/0304687 A1 Dec. 15, 2011

(51) Int. Cl.
*G06K 9/40* (2006.01)
*G06K 9/00* (2006.01)
*G09G 1/14* (2006.01)
*G09G 3/28* (2006.01)
*G09G 3/30* (2006.01)
*G09G 5/00* (2006.01)
*H04N 9/64* (2006.01)
*H04N 5/202* (2006.01)
*H04N 1/40* (2006.01)
*G03F 3/08* (2006.01)

(52) U.S. Cl.
USPC ............ 382/274; 382/167; 345/20; 345/63; 345/77; 345/581; 348/251; 348/254; 358/461; 358/518

(58) Field of Classification Search .................. None
See application file for complete search history.

(56) References Cited

U.S. PATENT DOCUMENTS

| | | | |
|---|---|---|---|
| 6,470,097 B1 * | 10/2002 | Lai et al. | 382/255 |
| 7,317,445 B2 | 1/2008 | Hekstra | |
| 7,548,659 B2 | 6/2009 | Ofek | |
| 7,561,186 B2 * | 7/2009 | Poon | 348/208.99 |
| 7,619,656 B2 | 11/2009 | Ben-Ezra | |
| 7,626,612 B2 | 12/2009 | John | |

(Continued)

FOREIGN PATENT DOCUMENTS

WO 2007007225 A2 1/2007

OTHER PUBLICATIONS

Okumura et al. ("Augmented Reality Based on Estimation of Defocusing and Motion Blurring from Captured Images", 2006, IEEE, pp. 219-225.*

(Continued)

*Primary Examiner* — Randolph I Chu
(74) *Attorney, Agent, or Firm* — Lyon & Harr, LLP; Mark A. Watson

(57) ABSTRACT

A "Blur Remover" provides various techniques for constructing deblurred images from a sequence of motion-blurred images such as a video sequence of a scene. Significantly, this deblurring is accomplished without requiring specialized side information or camera setups. In fact, the Blur Remover receives sequential images, such as a typical video stream captured using conventional digital video capture devices, and directly processes those images to generate or construct deblurred images for use in a variety of applications. No other input beyond the video stream is required for a variety of the embodiments enabled by the Blur Remover. More specifically, the Blur Remover uses joint global motion estimation and multi-frame deblurring with optional automatic video "duty cycle" estimation to construct deblurred images from video sequences for use in a variety of applications. Further, the automatically estimated video duty cycle is also separately usable in a variety of applications.

20 Claims, 6 Drawing Sheets

U.S. PATENT DOCUMENTS

| | | | | |
|---|---|---|---|---|
| 2005/0231603 | A1* | 10/2005 | Poon | 348/208.99 |
| 2006/0280249 | A1* | 12/2006 | Poon | 375/240.16 |
| 2008/0232707 | A1 | 9/2008 | Lee | |
| 2008/0253676 | A1* | 10/2008 | Oh et al. | 382/255 |
| 2011/0299793 | A1* | 12/2011 | Miura et al. | 382/275 |

OTHER PUBLICATIONS

Ben Ezra, Moshe et al., "Motion Deblurring Using Hybrid Imaging", Proceedings IEEE Computer Society Conference on Computer Vision and Pattern Recognition. 2003.*

Yuan, Lu et al., "Image Deblurring with Blurred/Noisy Image Pairs," SIGGRAPH07, Aug. 5-9, 2007.*

Agrawal, A. K., Y. Xu, R. Raskar, Invertible motion blur in video, Mitsubishi Electric Research Laboratories, TR2009-051, Sep. 2009, pp. 1-10.

Baker, S., D. Scharstein, J. P. Lewis, S. Roth, M. J. Black, R. Szeliski, A database and evaluation methodology for optical flow, IEEE 11th Int'l Conf. on Comp. Vision, ICCV 2007, Oct. 14-20, 2007, pp. 1-8, Rio de Janeiro, Brazil.

Bascle, B., A. Blake, A. Zisserman, Motion deblurring and super-resolution from an image sequence, Proc. of the 4th European Conf. on Comp. Vision, Apr. 15-18, 1996, pp. 573-582, vol. II, Cambridge, UK.

Cho, S., Y. Matsushita, S. Lee, Removing non-uniform motion blur from images, IEEE 11th Int'l Conf. on Comp. Vision, ICCV 2007, Oct. 14-20, 2007, pp. 1-8, Rio de Janeiro, Brazil.

Dai, S., Y. Wu, Motion from blur, 2008 IEEE Comp. Society Conf. on Comp. Vision and Pattern Recognition, CVPR 2008, Jun. 2008, pp. 24-26, Anchorage, Alaska, USA.

Hsu, S. C., Moving-object reconstruction from camera-blurred sequences using interframe and interregion constraints, RLE Technical Report No. 542, Research Laboratory of Electronics, Apr. 1989, pp. 1-169, Massachusetts Institute of Technology, Cambridge, MA, USA.

Jin, H., P. Favaro, R. Cipolla, Visual tracking in the presence of motion blur, 2005 IEEE, Comp. Society Conf. on Comp. Vision and Pattern Recognition, CVPR 2005, Jun. 20-26, 2005, pp. 18-25, San Diego, CA, USA.

Joshi, N., W. Matusik, S. Avidan, H. Pfister, W. T. Freeman, Exploring defocus matting: Nonparametric acceleration, super-resolution, and off-center matting, IEEE Comp. Graphics and Applications, Mar./Apr. 2007, pp. 43-52, vol. 27, No. 2.

Kamthe, A., L. Jiang, A. Cerpa, SCOPES: Smart cameras object position estimation system, Technical Report TR-2007-002, University of California, Merced, Sep. 14, 2007, pp. 17.

Levin, A., R. Fergus, F. Durand, W. T. Freeman, Image and depth from a conventional camera with a coded aperture, ACM Trans. Graph., Jul. 2007, vol. 26, No. 3, pp. 9.

Li, Y., D. P. Huttenlocher, Sparse long-range random field and its application to image denoising, Proc. of the 10th European Conf. on Comp. Vision, ECCV 2008, Oct. 12-18, 2008, pp. 344-357, Part III, Marseille, France.

Liu, C., R. Szeliski, S. B. Kang, C. L. Zitnick, W. T. Freeman, Automatic estimation and removal of noise from a single image, IEEE Trans. Pattern Anal. Mach. Intell., Feb. 2008, pp. 299-314, vol. 30, No. 2.

Lu, P.-Y., T.-H. Huang, M.-S. Wu, Y.-T. Cheng, Y.-Y. Chuang, High dynamic range image reconstruction from hand-held cameras, 2009 IEEE Comp. Society Conf. on Comp. Vision and Pattern Recognition, CVPR 2009, Jun. 20-25, 2009, pp. 509-516, Miami, Florida, Usa.

Matsushita, Y., E. Ofek, W. Ge, X. Tang, H.-Y. Shum, Full-frame video stabilization with motion inpainting, IEEE Trans. Pattern Anal. Mach. Intell., Jul. 2006, pp. 1150-1163, vol. 28, No. 7.

McGuire, M., W. Matusik, H. Pfister, J. F. Hughes, F. Durand, Defocus video matting, ACM Trans. Graph., Jul. 2005, pp. 567-576, vol. 24, No. 3.

Nocedal, J., Updating quasi-newton matrices with limited storage, Mathematics of Computation, Jul. 1980, pp. 773-782, vol. 35, No. 151.

Onogi, M., H. Saito, Mosaicing and restoration from blurred image sequence taken with moving camera, Proc. of the Third Int'l Conf. on Advances in Pattern Recognition, ICAPR 2005, Part II, Aug. 22-25, 2005, pp. 598-607, Bath, UK.

Sellent, A., M. Eisemann, I. M. Magnor, Calculating motion fields from images with two different exposure times, Technical Report May 6, 2008, May 29, 2008, Comp. Graphics Lab.

Shan, Q., J. Jia, A. Agarwala, High-quality motion deblurring from a single image, ACM Trans. Graph., Aug. 2008, vol. 27, No. 3.

Tai, Y.-W., H. Du, M. S. Brown, S. Lin, Image/video deblurring using a hybrid camera, IEEE Comp. Society Conf. on Comp. Vision and Pattern Recognition, CVPR 2008, Jun. 24-26, 2008, Anchorage, Alaska, USA.

Tico, M., M. Vehvilainen, Robust image fusion for image stabilization, Proc. of the IEEE Int'l Conf. on Acoustics, Speech, and Signal Processing, ICASSP 2007, Apr. 15-20, 2007, pp. 565-568, Honolulu, Hawaii, USA.

Yuan, L., J. Sun, L. Quan, H.-Y. Shum, Image deblurring with blurred/noisy image pairs, ACM Trans. Graph., Jul. 2007, pp. 9, vol. 26, No. 3.

* cited by examiner

GENERATING SHARP IMAGES, PANORAMAS, AND VIDEOS FROM MOTION-BLURRED VIDEOS

BACKGROUND

1. Technical Field

A "Blur Remover" constructs one or more deblurred images, including panoramic or mosaic images, from a sequence of motion-blurred images such as a video sequence of a scene obtained using conventional digital video capture devices, and in particular, the Blur Remover provides various techniques for using joint global motion estimation and multi-frame deblurring with optional automatic video duty cycle estimation to construct deblurred images for use in a variety of applications.

2. Background

Image deblurring is a widely studied problem in computer vision, with a broad range of real-world applications. Removing blur is, in general, an ill-posed problem due to the loss of information caused by blurring. The most common types of blur are motion blur and defocus blur. Defocus blur is usually isotropic and its point spread function (PSF) is often modeled approximately as a Gaussian. Motion blur, on the other hand, is usually more complex due to the dynamics of the scenes and camera motion.

For example, one type of conventional image deblurring assumes that blur is entirely due to motion, i.e. there is no defocus blur caused by an out of focus lens, and that a "blur kernel" can be parameterized by a 1-D motion vector. For example, one such technique derives a local motion blur constraint and extends it to the α channel. Since the method is based on local constraints, it can be used to estimate non-parametric motion blur as well as rigid and spatially invariant motion blur. However, there are several limitations. First, the method requires that the values of the α channel can be determined accurately, which is a challenging task even for sharp images. Second, the derivation of the α-motion blur constraint assumes that the image is constant within any neighborhood of the same size as the blur kernel. This assumption is reasonable as long as the image is smooth and the spatial extent of the blur kernel is small. However if the image is highly textured or the blur kernel is large, the constraint will become invalid. Finally, this particular technique does not make use of multiple images.

A related technique addresses the problem of simultaneous tracking and deblurring in motion blurred image sequences. This technique is based on the observation that successive motion blur operations are commutative. Hence, for two sequential blurred images, blurring the first image using the blur kernel of the second image should produce the same result as blurring the second image using the blur kernel of the first image, up to a transform due to motion. One advantage of this approach is that it allows one to solve for motion with performing deblurring, hence making tracking easier. Unfortunately, if the objective is to deblur the images, the blur kernels estimated in this way are only relative. In particular, they satisfy a blur constraint but are not necessarily the actual kernels that produced the input images. Therefore, this technique requires the introduction of additional regularization and some image prior. Further, this technique seems to assume that the blur kernel can be modeled as a 1-dimensional Gaussian, which may be overly restrictive.

A related technique, considered an extension to the technique summarized above, uses a similar blur constraint and again assumes the blur kernel is a 1-dimensional Gaussian. However, unlike the above-described technique that focuses on a region with a single parametric motion, this related technique uses segmentation masks to simultaneously estimate multiple (parametric) motion blurs over the whole image as well as handling occlusions. However, while capable of estimating multiple motions/blurs, it shares most of the assumptions of the above-described technique, and hence its limitations regarding the need to introduce additional regularization and some image prior.

A different type of conventional deblurring involves the consideration of single image deblurring problems where the blur is entirely due to camera shake. For example, one such technique assumes the blur kernel is not necessarily parametric (e.g., by a 1-D motion vector), but also assumes that it is constant throughout the image. This technique casts the joint estimation of blur kernel and deblurred image as a maximum a posteriori (MAP) estimation problem in a probabilistic framework, though the likelihood term does not in fact fit into a probabilistic model. As is common with such processes, alternating optimization techniques are used to compute blur and the deblurred image. Although this technique is capable of producing good deblurring results, it unfortunately requires that a large number of parameters be set manually, with different optimal values being used for different inputs. Consequently, the applicability of such techniques is limited by the requirement to provide substantial user input and the lack of automated solutions for the various parameters.

Another type of conventional deblurring technique addresses both motion and defocus blur by modeling a blurred image as the result of a generative process, where an "ideal" image is blurred by motion and defocusing respectively at successive stages of the generation process. Region tracking is then used to determine motion, which in turn determines the motion blur. A latent image at higher resolution is then estimated by minimizing the difference between the observed image and the image generated from the latent image under the model (subject to a second-order smoothing constraint). Therefore, in addition to handling both motion and defocus blur, this technique also performs super resolution (i.e., upscaling relative to the original resolution). This technique assumes that the 1-D motion producing the blur is the same as the motion between images, which is reasonable if the motion does not change much between successive images. However, if the motion between images varies significantly, the estimated blur kernel is inaccurate. Further, in order to estimate motion, this technique requires reliable inter-image tracking, which can be challenging in presence of blur. This can be a problem in successfully deblurring images, especially if the blur kernel varies over time, since this would change the appearance of objects.

Yet another conventional technique attempts to solve various deblurring issues by addressing the problem of zeros in the frequencies of blur kernels by jointly deblurring a sequence of multiple images that are taken with different exposure times. This technique demonstrates that a joint deconvolution filter does not suffer from the divide-by-zero problem that affects single image deconvolution due to nulls of the PSF in frequency domain, unless the nulls of all the PSFs coincide somewhere (which is unlikely in practice due to varying exposure times). However, the method has various restrictions, including that the scene must consist of a single moving object at constant velocity and static background. In addition, the exposure times need to be known, and must form a periodic sequence in order to estimate motion. While these requirements are not uncommon in various conventional deblurring techniques, they are not typically met in most real-world videos unless those videos are captured under carefully controlled conditions.

A number of other conventional deblurring methods either use specialized hardware or assume a highly controlled environment that is not typically met with most real-world videos. For example, one such technique uses simultaneously captured high-resolution video at a low frame rate and low-resolution video captured at a high frame rate. Another such technique uses a blurred long-exposure image and a noisy short-exposure image of the same scene. Yet another such technique addresses the problem of motion blur by taking many short exposure (and hence high noise) images so that they are relatively free from blur. However, this technique does not actually model blur and hence is not applicable to inputs that do contain substantial amount of blur. While techniques such as these that make use of extra information are generally successful in improving image restoration quality, such information is usually not available in images and videos taken by ordinary people (e.g., a home video of a day at the beach taken on a typical video recording device).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Blur Remover," as described herein, provides various techniques for constructing one or more deblurred images, including deblurred static images deblurred panoramic or mosaic images and deblurred video sequences, from a sequence of motion-blurred images such as a video sequence of a scene. Significantly, this deblurring is accomplished without requiring specialized side information or camera setups. In fact, the Blur Remover receives sequential images, such as a typical video stream captured using conventional digital image capture devices, and directly processes those images to generate or construct deblurred images for use in a variety of applications. No other input beyond the video stream is required for a variety of the embodiments enabled by the Blur Remover. Conventional digital image capture devices include a variety of devices, such as, for example, video capture enabled cell phones, video capture enabled PDA's, dedicated digital video cameras, webcams, etc.

More specifically, the Blur Remover provides various techniques for using joint global motion estimation and multi-frame deblurring with optional automatic video camera "duty cycle" estimation to construct deblurred images. These deblurred images can then be used for broad variety of purposes, such as, for example, constructing mosaic and/or panoramic images, identifying objects in images, sharpening particular objects, faces, text, etc., in images, etc. Note that camera "duty cycle" is defined as the percentage of time that the camera image sensor was actually exposed from frame to frame. For example, when capturing images at 30 frames per second (fps), the actual camera duty cycle, $\tau$, will not be $\frac{1}{30}$ second, but will generally be some percentage of that time, ranging from about 40% to about 80%, corresponding to the time during each $\frac{1}{30}$ second within which the camera image sensor is actually being exposed to light from the scene. Consequently, if the camera duty cycle is known, optical motion between image frames can be estimated with much higher accuracy, thereby providing an improved deblurring output.

In view of the above summary, it is clear that the Blur Remover described herein provides various techniques for using joint global motion estimation and multi-frame deblurring with optional automatic video "duty cycle" estimation to construct deblurred images from an input video stream for use in a broad variety of real-world applications. In addition to the just described benefits, other advantages of the Blur Remover will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
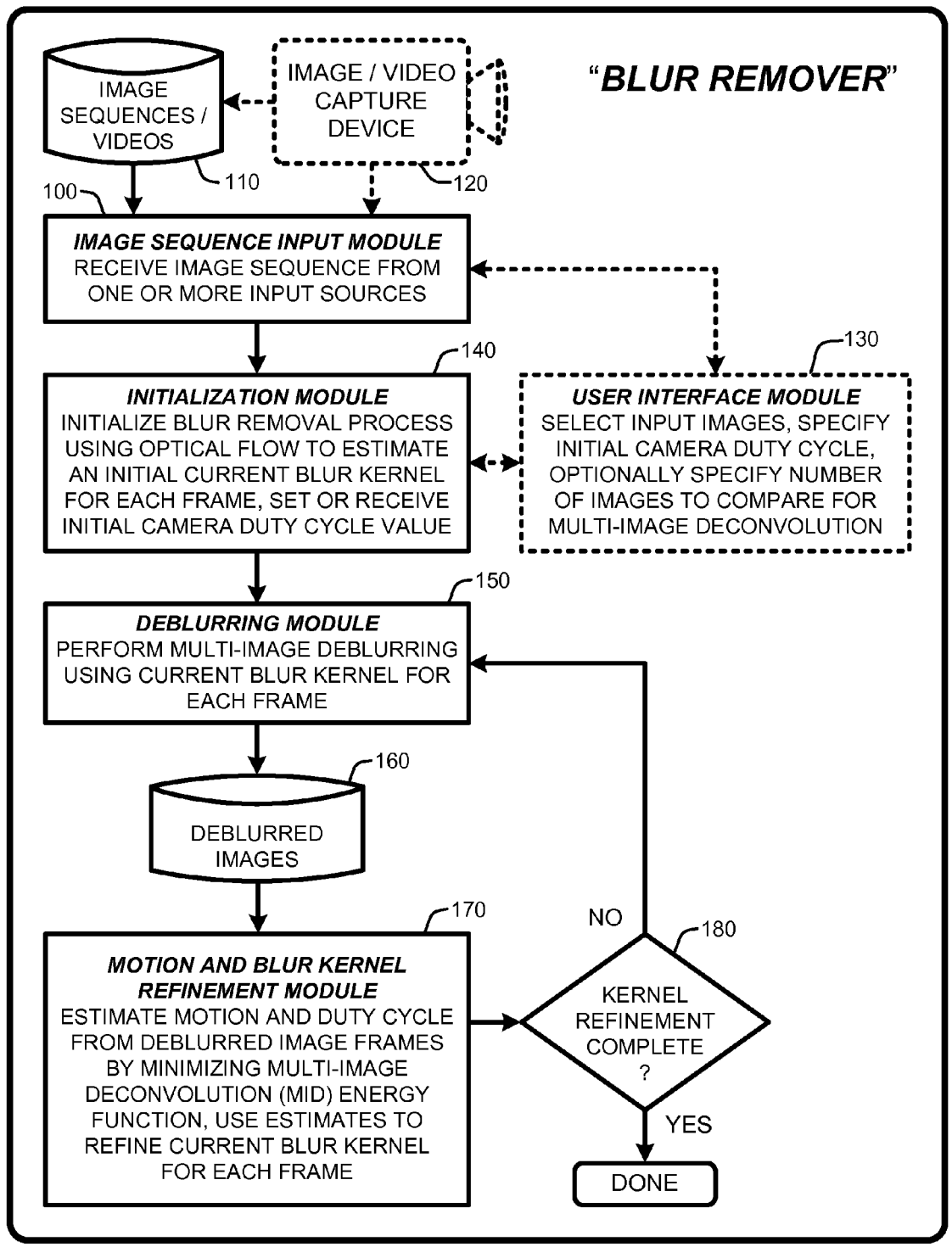
FIG. 1 illustrates an exemplary architectural flow diagram that illustrates program modules for producing deblurred images from a sequence of motion-blurred input images using a "Blur Remover," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Blur Remover," as described herein, provides various techniques for using joint global motion estimation and multi-frame deblurring with optional automatic video "duty cycle" estimation to construct deblurred images from an input video stream for use in a broad variety of real-world applications. Examples of such real-world applications include, but are clearly not limited to, deblurring of individual images extracted from an image sequence captured using a video camera or the like, construction of panoramic or mosaic images using deblurred images generated from an image sequence, deblurring of the entire video sequence, enhanced object tracking, facial recognition, object recognition, etc. Note that for purposes of explanation, the discussion of the Blur Remover provided herein focuses on blur due to either or both defocus and camera motion, with the assumption that objects in the scene are sufficiently far away from the camera that optical parallax is not a significant factor. However, it should be understood that blur caused by a variety of other sources, including parallax, may also be addressed using the techniques described herein.

Note that the "duty cycle" of a video camera defines the percentage of time for each image frame that the camera image sensor was actually exposed while each image frame was being captured. However, this exposure time is not equivalent to the camera frame rate since the image capture process is generally not an instant on, instant off process. Note also, that the camera duty cycle provides useful information that is used in a variety of real-world applications, including, but not limited to, the deblurring techniques described herein. The Blur Remover is capable of accurately estimating the duty cycle of a camera directly from a blurred video sequence captured from that camera. More specifically, the camera "duty cycle" is defined as the percentage of time that the camera image sensor is actually being exposed from frame to frame. For example, when capturing images at 30 frames per second (fps), the actual camera duty cycle, $\tau$, will not be 1/30 second, but will generally be some percentage of that time, ranging from about 40% to about 80% or so of the nominal frame rate on a per-frame basis. The value of the duty cycle $\tau$ will vary depending upon the nominal frame rate of the video sequence and possibly other camera specific features or settings.

However, regardless of the cause of the variation in duty cycle, the Blur Remover is capable of accurately estimating the camera duty cycle directly from the video sequence on either a frame-by-frame basis, or across the entire video sequence. As noted above, this duty cycle information is then useful for a variety of applications. For example, if the camera duty cycle is known, optical motion between image frames can be estimated with much higher accuracy, thereby providing an improved deblurring output since the deblurring processes described herein use an optical flow process based on motion between image frames to estimate and iteratively refine the blur kernels that are used to deblur images.

1.1 System Overview:

As noted above, the "Blur Remover," provides various techniques for using joint global motion estimation and multi-frame deblurring with optional automatic video "duty cycle" estimation to construct deblurred images from an input video stream for use in a broad variety of real-world applications. The processes summarized above are illustrated by the general system diagram of FIG. 1. In particular, the system diagram of FIG. 1 illustrates the interrelationships between program modules for implementing various embodiments of the Blur Remover, as described herein. Furthermore, while the system diagram of FIG. 1 illustrates a high-level view of various embodiments of the Blur Remover, FIG. 1 is not intended to provide an exhaustive or complete illustration of every possible embodiment of the Blur Remover as described throughout this document.

In addition, it should be noted that any boxes and interconnections between boxes that may be represented by broken or dashed lines in FIG. 1 represent alternate embodiments of the Blur Remover described herein, and that any or all of these alternate embodiments, as described below, may be used in combination with other alternate embodiments that are described throughout this document.

In general, FIG. 1 illustrates a high level view of the deblurring process wherein the motions and blur kernels (assuming duty cycles of 100% as initialization) are first estimated for each image to start the joint estimation process. Note that duty cycles are generally assumed to be 100% for purposes of initialization. However, this initial duty cycle estimate can be set to any desired level, and the iterative refinement process will rapidly converge to the actual camera duty cycle, as described in further detail herein. The joint estimation process illustrated by FIG. 1 iteratively refines the values of motions and duty cycles for each image, with these values being used to estimate the blur kernels. This joint estimation process generally consists of two parts at every iteration: (1) Given the blur kernels at every frame, perform multi-image deblurring, and (2) given the deblurred frames, refine the motion and duty cycle, thereby refining the blur kernels for each image.

More specifically, as illustrated by FIG. 1, the Blur Remover begins the deblurring process by using an image sequence input module 100 to receive an image sequence or video 110. The image sequence or video 110 is either pre-recorded, or is recorded or captured using a conventional image or video capture device 120. Note also that an optional user interface module 130 can be used to select from a library or list of the images or videos 110, and can also be used to select a live input from one or more of the image or video capture devices 120.

Once the image sequence or video 110 has been selected or otherwise specified, it is provided to an initialization module 140. The initialization module 140 receives the input image sequence and acts to initialize the blur removal process by using optical flow to estimate an initial current blur kernel for each frame. Note that the initialization module 140 also sets or receives the initial camera duty cycle value. As noted above, the Blur Remover can use a fixed value (e.g., 100%, 75%, etc.) as an initial estimate for the duty cycle. However, the initial value or estimate (ranging from 0 to 1, or from 0% to 100%) for the duty cycle can also be input by the user via the user interface module 130. Note also that the number of images that are to be compared (since the Blur Remover uses a multi-image deconvolution process) can also be specified via the user interface. Generally, values between 1 and 3 adjacent images were used for comparison, as discussed in further detail below. However, it should be understood that, as discussed in further detail below, the specified number of images can be set to any desired value.

Once the initialization module 140 has produced the initial estimates, this information is provided to a deblurring module 150 which performs multi-image deblurring using the current blur kernel for each image frame. In the initial pass through the deblurring module 150, the current blur kernel is simply the estimate provided by the initialization module. However, as discussed below, the current blur kernel is refined with each iteration of the overall refinement process. In any case, the output of the deblurring module 150 is a set of deblurred images 160 (or, as discussed in Section 2.3.1, a single panorama).

The deblurred images 160 are then passed to a motion and blur kernel refinement module 170 that processes the deblurred images to again estimate motion and camera duty cycle from the deblurred image frames. These estimates are then used to refine the current blur kernel for each frame. A determination 180 of whether the refinement of the current blur kernel is complete is then made. In general, refinement is considered to be complete when convergence of the blur kernel has been achieved (i.e., when further refinement results in changes to the blur kernel below some threshold value), or when a maximum number of iterations has been reached.

In the case that blur kernel refinement is determined 180 to be complete, processing of the image sequence terminates, and the deblurred images 160 are provided as an output for whatever uses or further processing is desired. In contrast, in the case that blur kernel refinement is determined 180 to not be complete, the refined blur kernel is provided to the deblurring module 150, which then acts to perform another iteration of deblurring, along with a refinement of the estimation of the motion and camera duty cycles for computing yet another refinement of the blur kernel. This iterative refinement process then continues until such time as the blur kernel refinement is determined 180 to be complete, at which time the deblurred images 160 are provided as an output for whatever uses or further processing is desired.

2.0 Operational Details of the Blur Remover:

The above-described program modules are employed for implementing various embodiments of the Blur Remover. As summarized above, the Blur Remover provides various techniques for using joint global motion estimation and multi-frame deblurring with optional automatic video "duty cycle" estimation to construct deblurred images from an input video stream for use in a broad variety of real-world applications. The following sections provide a detailed discussion of the operation of various embodiments of the Blur Remover, and of exemplary methods for implementing the program modules described in Section 1 with respect to FIG. 1. In particular, the following sections provide examples and operational details of various embodiments of the Blur Remover, including: an operational overview of the Blur Remover; a blur model for use by the Blur Remover; multi-image deconvolution; iterative refinement; and handling of localized parallax and object motion issues.

2.1 Operational Overview:

As noted above, the Blur Remover-based processes described herein provide various techniques for constructing deblurred images from a sequence of motion-blurred images such as a video sequence of a scene. Significantly, this deblurring is accomplished without requiring specialized side information or camera setups. In fact, the Blur Remover receives sequential images, such as a typical video stream captured using conventional digital video capture devices, and directly processes those images to generate or construct deblurred images for use in a variety of applications. No other input beyond the video stream is required for a variety of the embodiments enabled by the Blur Remover. More specifically, the Blur Remover uses joint global motion estimation and multi-frame deblurring with optional automatic video "duty cycle" estimation to construct deblurred images from video sequences for use in a variety of applications.

2.2 Blur Model:

In general, the Blur Remover uses a blur model that assumes that blur in the input video sequences comes from one or both of two sources: 1) defocusing blur; and 2) blur from camera motions such as rotations and/or translations. In operation, the Blur Remover acts to separate the defocus blur from motion blur, and then to remove or correct the motion blur from the images of the image sequence. Note that while defocus blur is not specifically addressed by the Blur Remover, there are a number of conventional defocus blur removal techniques that can be applied as a post-process to the output of the Blur Remover (following removal of motion blur) to further enhance the quality of deblurred images. Further, the Blur Remover also assumes that objects in the scene are approximately static, and sufficiently far away, so that any two consecutive images can be related by a homography (i.e., there is no or negligible parallax from objects in one frame to those objects in the next frame). However, as discussed in Section 2.5, localized parallax issues are also successfully addressed by various embodiments of the Blur Remover.

Note that while the blur model assumptions described above are not intended to be precisely satisfied in practice (nor is it required that these assumptions are precisely satisfied), these assumptions are reasonable approximations under the majority of typical scenarios (e.g., typical user hand holding a camera and panning around a scene) due to the relatively high sampling rate of videos. In particular, the exposure time and the time between consecutive frames is relatively short (e.g., approximately ⅟30 second for video at 30 fps). Therefore, the amount of translation of the camera (or moving objects in the scene) between successive exposures is negligible as long as the camera is moving relatively slowly and/or objects in the scene are moving at a relatively slow speed from frame to frame. Thus, while a real-world video of the scene may be dynamic due to relative object and/or camera motion, the absolute scene motion is typically sufficiently small compared with the relative motion between the scene and the camera that the above-described assumptions are approximately satisfied to provide high quality deblurring results. Consequently, any discussion provided herein relating to static or unmoving cameras, scenes and/or objects should be understood to be "approximately static" in view of the above discussion. Furthermore, in various embodiments, areas detected to not be static can be down-weighted or ignored by the Blur Remover.

Note also that while the Blur Remover is capable of processing videos having highly dynamic scenes with fast moving objects (or a fast moving camera), such cases tend to produce somewhat degraded deblurring results relative to less dynamic scenes. However, given a sufficiently high frame rate with correspondingly short exposure times, even highly dynamic video sequences can be used to produce high quality deblurring results from the input video sequence. Note also that there is no requirement to provide the Blur Remover with the exact orientation of the camera for each frame since motion information is estimated by computing parametric optical flow between frames, as described in further detail herein.

2.3 Multi-Image Deconvolution (MID):

The following paragraphs describe various embodiments of the Blur Remover for removing motion blur, independent of the presence of defocus blur. It is assumed that a transformation (i.e., warping) between nearby frames as well as the motion blur for each frame can be obtained by computing an optical flow between frames. For motion blur, the direction of that motion is then determined by the optical flow. However, the extent or spread of the motion blur depends also on the camera "duty cycle", namely the actual camera sensor exposure time multiplied by the frame rate. Further, since it is assumed that the scene is approximately static and that the camera motion is approximately pure rotation (again, assuming that camera translation motion is negligible compared to the frame rates), the transformation between any two frames can be accomplished using a homography, or similar linear transformation (such as affine, similarity, or translation).

In particular, let $I_1, \ldots, I_n$ be a sequence of observed images with motion blur, and let $L_1, \ldots, L_n$ be the corresponding underlying latent images without motion blur (i.e., the latent image is initially an unknown unblurred image that will be recovered by the Blur Remover using the techniques described herein). If each image is regarded as an m-dimensional vector, where m is the number of pixels, then the spatially varying motion blur can be represented as sparse m-by-m matrices $B_1, \ldots, B_n$, as illustrated by Equation (1):

$$I_i = B_i L_i + N_i \qquad \text{Equation (1)}$$

for each image $i \in \{1, \ldots, n\}$, where $N_i$ is the noise. Note that in various embodiments, the noise, $N_i$ is considered to have an approximately constant variance over the image sequence (i.e., $N_i$=N). However, in various embodiments, $N_i$ is estimated on a frame-by-frame basis using conventional noise modeling techniques.

Further, let $A_{i,j}$ denote the warping to frame i from frame j, i.e.

$$L_i = A_{i,j} L_j \qquad \text{Equation (2)}$$

Hence, combining Equation (1) and Equation (2) gives:

$$I_i = B_i A_{i,j} L_j + N_i \qquad \text{Equation (3)}$$

For purposes of explanation, assume that noise in each image frame is Gaussian. Then, the maximum-likelihood estimate for frame j is attained by minimizing the energy function of Equation (4), where:

$$E_{ML}(L_j) = \sum_{i=max(j-r,1)}^{min(j+r,n)} \left\| \sum_{i}^{-1} (B_i A_{i,j} L_j - I_i) \right\|^2 \qquad \text{Equation (4)}$$

where $\Sigma_i$ is a diagonal matrix whose entries are the standard deviations of noise $N_i$, i.e., $\sigma_{noise}$, at each pixel in the i-th image and r is the number of nearby observations (i.e., nearby image frames) to include in each temporal direction (i.e., preceding image frames and succeeding images frames) for MID. Note that the term $\Sigma^{-1}$ is also referred to herein as "noise matrices". In various tested embodiments of the Blur Remover, r is typically in the range of 1 to 3 (i.e., from three to seven sequential images, which include the current image frame and from one to three nearby observations in each temporal direction—before and after the current image frame), but can be set to larger values if desired. Note also that if r=0, the problem reduces to single image deconvolution (since with r=0 there are no nearby observations).

Figure 2:
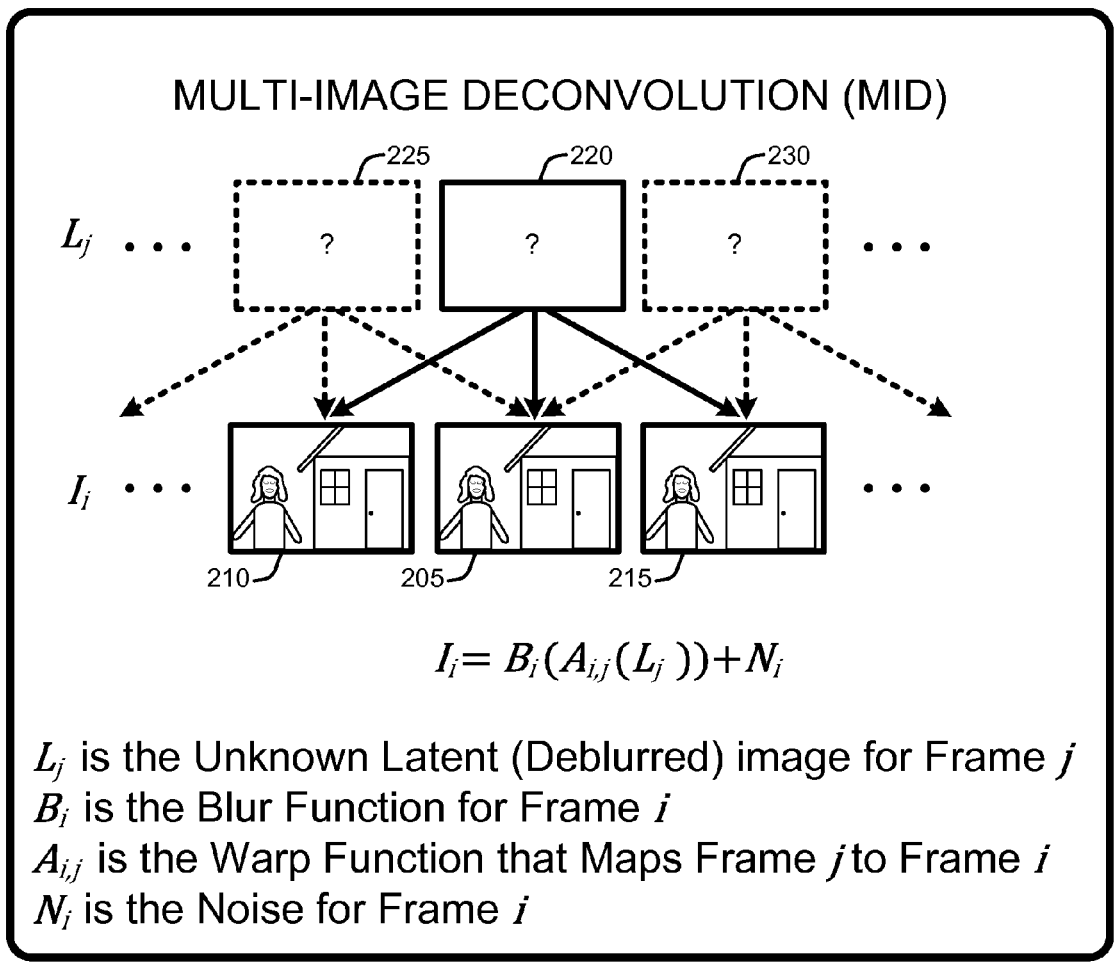
FIG. 2 illustrates an example of multi-image deconvolution for use with an energy function that is minimized to refine motion and duty cycle estimates for refining a current blur kernel, as described herein.

The MID process described above is generally illustrated by FIG. 2. In general, FIG. 2 shows an example of multi-image deconvolution which makes use of three sequential images (i.e., r=1), which include a current image frame 205, one preceding image frame 210, and one succeeding image frame 210. Note that each of these three image frames directly corresponds to an unknown latent image frame (i.e., frames 220, 225, and 230, respectively). Thus, by computing the latent images based on the energy minimization techniques described herein the set of deblurred output images is generated.

Because the process of deblurring is ill-posed in general, the Blur Remover uses an "image prior" on the latent image L that regularizes its gradients. Therefore, the maximum a posteriori (MAP) estimate corresponds to the minimum of the energy function illustrated by Equation (5):

$$E_{MAP}(L_j) = \sum_{i=max(j-r,1)}^{min(j+r,n)} \left\| \sum_{i}^{-1} (B_i A_{i,j} L_j - I_i) \right\|^2 + \rho(C_g L_j) \qquad \text{Equation (5)}$$

where $C_g$ is a matrix representation of convolving an image with a set of linear filters, and $\rho(\bullet)$ is a functional form of the prior. Note that the linear filters used by the Blur Remover are generally gradient type filters, but that other filters can also be used, if desired. The overall energy function is then minimized numerically using any of a number of conventional gradient-based optimization techniques. Such minimization techniques are well known to those skilled in the art, and will not be described in detail herein.

2.3.1 MID for Panoramas:

The MID processes described above in Section 2.3 can be extended to create deblurred images from an image sequence that are automatically mapped to a single panorama, P, which takes the place of the set of latent images, $L_j$. In this case, Equation (5) is modified to consider the single panorama, where the warping function, $A_i$, maps the panorama to the current image frame instead of mapping each latent image frame to the current image as described in Section 2.3. In addition, Equation (5) is further modified to incorporate a cropping function, CF. Note that these concepts also require a new definition for the current image frame such that in the case of panoramas, $I_i$=CF($B_i A_i P$)+$N_i$. Note how this differs from Equation (3), where, for the non-panorama case, $I_i = B_i A_{i,j} L_i + N_i$. Given this understanding, in the case of creating a deblurred panoramic image from the input image sequence, Equation (5) is rewritten as Equation (5A), where:

$$E_{MAP}(P) = \sum_{i=max(j-r,1)}^{min(j+r,n)} \left\| \sum_{i}^{-1} CF(B_i A_i P) - I_i \right\|^2 + \rho(C_g P) \qquad \text{Equation (5A)}$$

Figure 3:
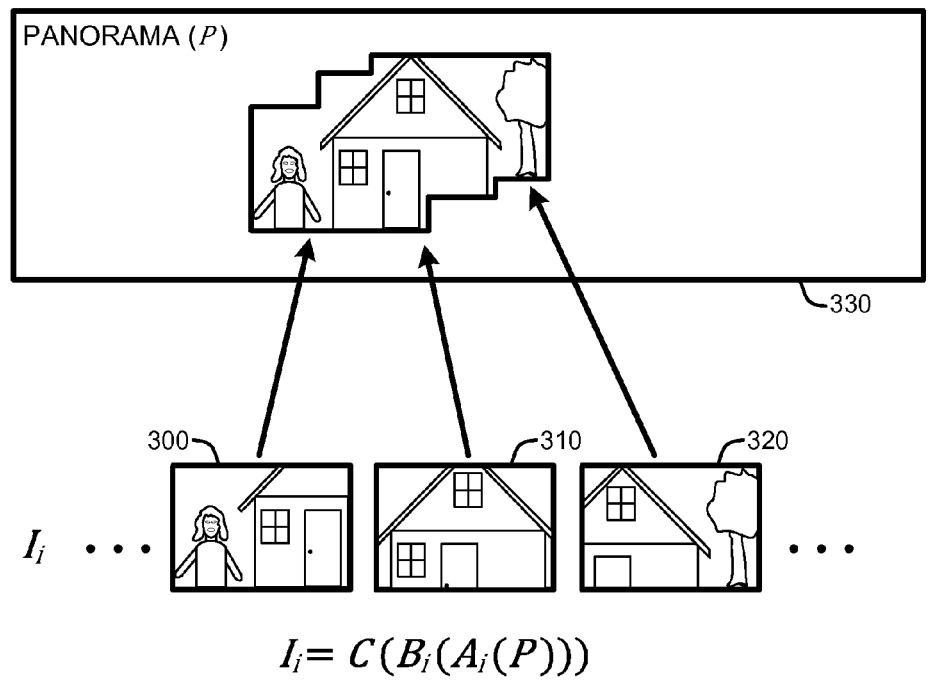
FIG. 3 illustrates an example of multi-image deconvolution, adapted for constructing panoramic images from a motion-blurred input image sequence, for use with an energy function that is minimized to refine motion and duty cycle estimates for refining a current blur kernel, as described herein.

The processes described above are generally summarized by FIG. 3. In general, FIG. 3 shows multi-image deconvolution (MID) with mapping of the deblurred images to a single panorama, P, instead of mapping those images to a set of corresponding latent images as illustrated by FIG. 2. More specifically, FIG. 3 shows an example of multi-image deconvolution which makes use of some number (i.e., r) of sequential images, including image frames 300, 310 and 320. In contrast to the Example of FIG. 2, these image frames 300, 310 and 320 are mapped to a single unknown panorama 330 as part of the energy minimization process. Note the difference between Equation (5), used for general MID with latent images corresponding to each input image, and Equation (5A), which is specifically adapted to a single panorama P instead of the latent images $L_j$. In other words, all instances of $L_j$ are replaced with single panorama, P, to construct Equation (5A), with the result being a deblurred panorama instead of multiple deblurred images. However, it should also be noted that the set of deblurred images constructed using Equation (5) can also be used to construct a panoramic or mosaic image using conventional techniques once the deblurred images have been generated from the input image sequence, as described herein.

Figure 4:
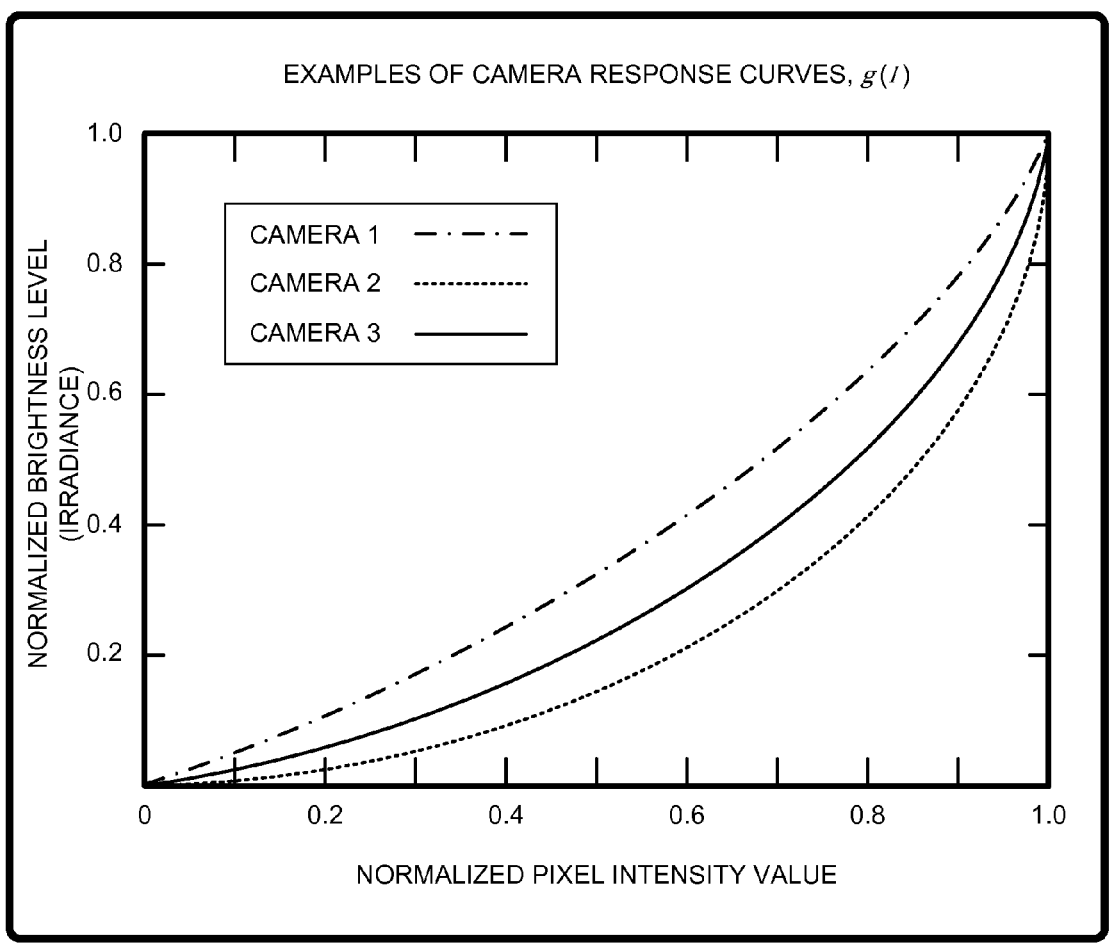
FIG. 4 illustrates an example of typical camera response curves, as described herein.

2.3.2 MID with Camera Response Curve Estimation:

If camera response curve, g(I), is linear, twice as much incoming light (irradiance) on the camera sensor will result in a doubling of pixel intensity. However, the response curve is typically nonlinear, such that, for example, twice as much incoming light does not result in doubling of pixel intensity. Typical deblurring techniques functions assume that the response curve is linear. However, the response curve g(I) can be characterized as either a gamma curve, polynomial curve, or non-parametric function, as illustrated by FIG. 4. Note that such functions can be determined experimentally or may be provided the camera manufacturer or other source.

For example, a simple experimental procedure for determining a response curve would be to increase brightness levels (i.e., irradiance) from zero up to the point of sensor saturation (after which increasing levels of brightness will have no additional effect on the sensor), while also recording pixel intensity values returned by the camera sensor at each brightness level. Given the measured values, a polynomial or non-linear function would then be fit to that data (using conventional curve fitting techniques) to generate the non-linear camera response curve, g(I). FIG. 4 provides three examples curves that would result from such a process. As can be seen, in the example of FIG. 4, the response curve g(I), for various cameras is non-linear.

Regardless of how the response curve g(I) is determined or obtained, that information is used by various embodiments to improve the resulting output image or images provided by the Blur Remover. In particular, Equation (5) is modified to incorporate the response curve, g(I), as illustrated by Equation (5B):

$$E_{MAP}(L_j) = \sum_{i=max(j-r,1)}^{min(j+r,n)} \left\| \sum_i^{-1} (g^{-1}(B_i A_{i,j} g(L_j)) - I_i) \right\|^2 + \rho(C_g L_j) \quad \text{Equation (5B)}$$

where g(x) maps nonlinear pixel intensity x to a linear intensity. Further, $g^{-1}(x)$ is its inverse, i.e., mapping linear back to non-linear. In particular, $L_j$ is linearized via g(x), followed by an application of the geometric and blur transforms (i.e., $B_i$ and $A_{i,j}$, respectively), followed by a conversion back to non-linear via $g^{-1}(x)$ in order to make the comparison against the observations (i.e., the input frames $I_i$), which are nonlinear. Note that both $L_j$ and $I_i$ are nonlinear with the same camera response curve. Note that form of the objective function illustrated by Equation (5B) is used in order to avoid the trivial solution of g(x)=0 and $L_j$=0. Further, a variation of this process that directly results in clean output frames, $L_j$, that are linear is illustrated by Equation (5C), where:

$$E_{MAP}(L_j) = \sum_{i=max(j-r,1)}^{min(j+r,n)} \left\| \sum_i^{-1} (g^{-1}(B_i A_{i,j}(L_j)) - I_i) \right\|^2 + \rho(C_g L_j) \quad \text{Equation (5C)}$$

Finally, it should be noted that the concepts described above with respect to the use of the camera response curve can also be applied in the case where panoramas are being constructed from the input image sequence as described in Section 2.3.1. In this case, Equation (5A) would be further modified to incorporate the camera response curve, g(I), in a similar manner to the process discussed above and illustrated with respect to either Equation (5B) or Equation (5C).

2.4 Iterative Refinement:

In general, it is possible to iteratively refine the optical flow estimation and deblurring output by using the latter from one iteration to estimate the former in the next iteration in an attempt to obtain more accurate flow and hence improve the quality of deblurring output in subsequent iterations. Unfortunately, while outputs can be produced using this iterative approach, experiments using various embodiments of the Blur remover illustrated that a "drifting" effect resulted in errors in flow estimation (hence image registration/alignment) that accumulate over iterations, making both flow and deblur reconstruction deteriorate over time.

One problem with the aforementioned iterative refinement approach is that flow estimation and deblurring operate as two separate black boxes with different objective functions. Therefore, there is no guarantee that the process will converge. Consequently, the simple iterative process described above is replaced by alternatives that aim to consistently minimize a single objective function.

In particular, let $(I_1, \ldots, I_n)$ be a blurred video of n frames, and $(L_1, \ldots, L_n)$ be the underlying sharp frames (i.e., the latent images) that are to be recovered as the deblurred output frames. Further, let $(H_1, \ldots, H_n)$ be the warps (i.e., the homographies) to each frame from some reference frame. Note that for n frames, there are in fact only n−1 independent warps since the warps are relative to each other. In this framework, both the relative warping between any two frames and the blur kernel for each frame are determine by these warps. Therefore, both $A_{i,j}$ and $B_i$ are functions of $(H_1, \ldots, H_a)$. Since correct warps are expected to result in deblurred output $(L_j)$ with lower energy according to Equation (5) than from incorrect warps, it is reasonable to minimize Equation (5) over the whole sequence with respect to the optical flows as well as the underlying latent images (i.e., the deblurred output). In other words, this process aims to minimize the following overall energy function:

$$E(L, H) = \sum_{j=1}^{n} \sum_{i=max(j-r,1)}^{min(j+r,n)} \left\| \sum_i^{-1} (B_i A_{i,j} L_j - I_i) \right\|^2 + \rho(C_g L_j) \quad \text{Equation (6)}$$

where $L=(L_1, \ldots, L_n)$ and $H=(H_1, \ldots, H_n)$.

If the minimization of Equation (6) is rewritten in as nested form, as illustrated by Equation (7):

$$\min_H \min_L E(L, H), \quad \text{Equation (7)}$$

then, for each given H, the inner minimization problem is simply multi-image deconvolution over the whole sequence. Thus, a conventional black box optimization method, such as, for example, the well known "Levenberg-Marquardt" process can be used to minimize the overall energy over H. In general, the Levenberg-Marquardt process provides a numerical solution to the problem of minimizing a function, generally non-linear, over a space of parameters of the function. However, such methods typically require a relatively large number of evaluations of the objective function. In the case of the Blur Remover, each objective function evaluation consists of performing deblurring on the whole video sequence. Therefore, while the above-described method will produce acceptable deblurring results, it has been observed to be relatively slow since it has a relatively large computational overhead for convergence.

Consequently, a faster approach (lower computational overhead) is used in various embodiments of the Blur Remover. In particular, in contrast to the techniques described above, this faster approach acts to minimize over L and H in an alternating fashion. Minimizing the energy over L fixing H is simply the deblurring step, while minimizing over H fixing L can be performed numerically using gradient descent based methods. Further, note that the aforementioned camera duty cycles $\tau=(\tau_1, \ldots, \tau_n)$ is incorporated in various embodiments of the Blur Remover as additional variables that are estimated together with H.

2.4.1 Pure Translation:

In the case of pure translation, which is a much simpler case than rotation/affine motion since it avoids any division/inversion, the warps H are simply translations. Let $h=(h_1, \ldots, h_n)$ be the 2-vectors corresponding to these translations. Denote $\theta=(h, \tau)$ for notational convenience. So, the energy function is given by Equation (8), where:

$$E(L, \theta) = \sum_{j=1}^{n} \sum_{i=max(j-r,1)}^{min(j+r,n)} \left\| \sum_{i}^{-1} (B_i A_{i,j} L_j - I_i) \right\|^2 + \rho(C_g L_j) \quad \text{Equation (8)}$$

Since the image prior $\rho(C_g L_j)$ does not depend on $\theta$, it can be ignored as far as the optimization of $\theta$ is concerned. In addition, for purposes of explanation and conciseness in the following equations, the noise matrices, $\Sigma^{-1}$, are omitted from the subsequent notation, since it is simply a weighting factor on each pixel. However, it should be understood that the noise matrices are used in improving the deblurred output images produced by the Blur Remover. Furthermore, the term $E(L, \theta)$ is written as simply $E(\theta)$ in all subsequent notation since minimization is with respect to $\theta$. Hence:

$$E(\theta) = \sum_{j=1}^{n} \sum_{i=max(j-r,1)}^{min(j+r,n)} \|B_i A_{i,j} L_j - I_i\|^2 \quad \text{Equation (9)}$$

Further, let $$L'_{i,j} = A_{i,j} L_j \quad \text{Equation (10)}$$

and $$I'_{i,j} = B_i L'_{i,j} = B_i A_{i,j} L_j, \quad \text{Equation (11)}$$

i.e., $L'_{i,j}$ is the sharp (deblurred) frame i obtained by warping $L_j$, and $I'_{i,j}$ is the blurred version of $L'_{i,j}$. Note that in the ideal case, $L'_{i,j}$ would be the same as $L_j$ if the motion estimation were perfect, however, this is not generally the case for real-world image sequences. Note that $B_i$, $A_{i,j}$, and hence $I'_{i,j}$, are all dependent on $\theta$. Therefore:

$$E(\theta) = \sum_{j=1}^{n} \sum_{i=max(j-r,1)}^{min(j+r,n)} \sum_{p \in pixels\ of\ I_i} D_{i,j,p}(\theta) \quad \text{Equation (12)}$$

where $$D_{i,j,p}(\theta) = (I'_{i,j}(p) - I_i(p))^2 \quad \text{Equation (13)}$$

Here, the term p is used to denote the 2-vector representing a pixel's location $(x_p, y_p)^T$ in the image. Therefore, it suffices to find the derivative of $D_{i,j,p}(\theta)$, which in turn depends on the derivative of $I'_{i,j}(p)$ (with respect to $\theta=(h, \tau)$). Recall that as discussed above, in the blur model used by the Blur Remover, the blur kernel is determined by the relative warps to the two adjacent frames (assuming the use of three frames, for example) due the assumption of piecewise constant motion, i.e., $$I'_{i,j}(p) = \int_{t=-\tau_i}^{\tau_i} L'_{i,j}(p + t(h_{i+sign(t)} - h_i)) dt \quad \text{Equation (14)}$$

where sign(t) is 1 if t is positive and −1 otherwise. Thus it can be approximated by a sequence of sampled points on the motion path for each point, as illustrated by Equation (15), where:

$$I'_{i,j}(p) = \frac{1}{2s+1} \sum_{k=-s}^{s} L'_{i,j}\left(p + \frac{|k|}{2s+1} \tau_i (h_{i+sign(k)} - h_i)\right) \quad \text{Equation (15)}$$

$$= \frac{1}{2s+1} \sum_{k=-s}^{s} L_j$$

$$\left(p + \frac{|k|}{2s+1} \tau_i (h_{i+sign(k)} - h_i) + (h_i - h_j)\right)$$

where the constant s is the number of samples in each temporal direction (independent of the duty cycles) used to approximate the blur kernel. Note that in a tested embodiment, values of s on the order of about 50 or so were used to provide good deblurring results. However, it should be understood that s can be set to any desired value here. Applying the chain rule, the derivative of $I'_{i,j}(p)$ is $$\frac{d}{d\theta} I'_{i,j}(p) = \nabla L_j(p'_{i,j,k}) \cdot \frac{1}{2s+1} \sum_{k=-s}^{s} \frac{d}{d\theta} p'_{i,j,k} \quad \text{Equation (16)}$$

where $$p'_{i,j,k} = p + \frac{|k|}{2s+1} \tau_i (h_{i+sign(k)} - h_i) + (h_i - h_j) \quad \text{Equation (17)}$$

and $\nabla L_j$ is the image gradient of $L_j$. In the case of i=n and k>0, $h_i - h_{i+1}$ is replaced with $h_{i-1} - h_i$ as an approximation (since $h_{n+1}$ does not exist). The case of i=1 and k<0 is handled similarly.

2.4.2 General Homography:

The situation for homography is analogous to the translation case described above. Recall that $H=(H_1, \ldots, H_n)$ are the warps (i.e., the homographies) to each frame from some reference frame, and the relative warp to frame i from frame j is thus $H_{i,j} = H_j^{-1} H_i$. Again let $\tau=(\tau_i, \ldots, \tau_n)$ denote the duty cycles for each frame, so that $\theta=(h, \tau)$ completely parameterizes the motion and the blur kernels. Let p now denote the homogeneous coordinates of a pixel in an image, i.e., $p=(x_p, y_p, 1)^T$. Therefore, to extend the relationship between the energy function and $\theta$ from translation to general homography, Equation (16) and Equation (17) are rewritten, so that:

$$I'_{i,j}(p) = \frac{1}{2s+1} \sum_{k=-s}^{s} L'_{i,j}(p'_{i,j,k}) \quad \text{Equation (18)}$$

with $$p'_{i,j,k} = \phi\left(H_{i,j}\left[p + \frac{|k|}{2s+1} \tau_i (\phi(H_{i+sign(k),i} \cdot p) - p)\right]\right) \quad \text{Equation (19)}$$

where $\phi(\cdot)$ is a projection of points in homogeneous coordinates onto the image plane z=1, i.e., $$\phi((x, y, z)^T) = \left(\frac{x}{z}, \frac{y}{z}, 1\right)^T \quad \text{Equation (20)}$$

assuming every pixel is moving at approximately constant velocity between successive frames. In reality this assumption can only approximate for any camera motion that involves perspective change. However, it is reasonable for videos since once can expect the perspective change between successive frames to be small (i.e., negligible). For this reason, a further approximation can be made to assume that $\phi(H_{i+sign(k),i} \cdot p) \approx H_{i+sign(k),i} \cdot p$ (which is valid when the perspective change in $H_{i+sign(k),i}$ is small negligible). Therefore, in view of these assumptions, it can be seen that Equation (19) simplifies to:

$$p'_{i,j,k} = \phi\left(H_j^{-1}\left[H_i + \frac{|k|}{2s+1}\tau_i(H_{i+sign(k)} - H_i)\right]p\right) \quad \text{Equation (21)}$$

The derivatives with respect to warps and duty cycles can therefore be obtained using standard matrix calculus with the chain rule. Specifically, let $\tilde{p}_{i,j,k}$ denote $$H_j^{-1}\left[H_i + \frac{|k|}{2s+1}\tau_i(H_{i+sign(k),i} - H_i)\right]p,$$

i.e., $\phi(\tilde{p}_{i,j,k}) = p'_{i,j,k}$. Then, the derivatives are given by:

$$\frac{\partial L'_{i,j} p'_{i,j,k}}{\partial H_j} = -H_j^{-1} p \nabla L'_{i,j}(p'_{i,j,k}) \nabla \phi(\tilde{p}_{i,j,k}) H_j^{-1} \quad \text{Equation (22)}$$

$$\frac{\partial L'_{i,j} p'_{i,j,k}}{\partial H_i} = \left(1 - \frac{|k|}{2s+1}\tau_i\right) p \nabla L'_{i,j}(p'_{i,j,k}) \nabla \phi(\tilde{p}_{i,j,k}) H_j^{-1} \quad \text{Equation (23)}$$

$$\frac{\partial L'_{i,j} p'_{i,j,k}}{\partial H_{i+sign(k)}} = \frac{|k|}{2s+1}\tau_i p \nabla L'_{i,j}(p'_{i,j,k}) \nabla \phi(\tilde{p}_{i,j,k}) H_j^{-1} \quad \text{Equation (24)}$$

$$\frac{\partial L'_{i,j} p'_{i,j,k}}{\partial \tau_i} = \quad \text{Equation (25)}$$
$$\frac{|k|}{2s+1} \nabla L'_{i,j}(p'_{i,j,k}) \nabla \phi(\tilde{p}_{i,j,k}) H_j^{-1} (H_{i+sign(k)} - H_i) p$$

In the case where $j=i+sign(k)$, i.e., $H_j$ and $H_{i+sign(k)}$ are the same matrix, its corresponding derivative is simply the sum of the right-hand sides of Equation (23) and Equation (25). The energy function is minimized via any desired gradient-based optimization method, such as, for example, the well-known "Limited-Memory BFGS" (i.e., L-BFGS). In particular, L-BFGS is an algorithm for quasi-Newton optimization that uses the Broyden-Fletcher-Goldfarb-Shanno (i.e., BFGS) update to approximate the Hessian matrix. L-BFGS is particularly well suited for optimization problems with a large number of dimensions. Note that gradient-based optimization methods are well known to those skilled in the art, and will not be described in detail herein.

In various tested embodiments of the Blur Remover, the duty cycles were initialized to 1, (i.e., 100%) for every frame. However, the iterative process described above quickly converges to provide an accurate estimate for the correct or actual duty cycle values even in cases where the initialization is quite far away from the true values. In the case where is initialization is close to the ground truth, the estimated values remain close to the true values over the iterations. In other words, the techniques described herein for estimation of duty cycles is quite robust.

Clearly, finding or estimating an accurate duty cycle is central to blur kernel estimation and to subsequent deblurring performance. In fact, when incorrect duty cycle values are used, restoration errors (i.e., deblurring errors) increase, with a dramatic decrease in such errors being observed as the duty cycles converge to the actual or correct values. Further, motion estimation also tends to improve over iterations for images sequences with pure translational camera motion. For those sequences also having rotational camera motion (and hence perspective change), motion errors roughly remain at the initial level through the iterative process described above. While these motion errors can be addressed using various techniques, if desired, the initial motion estimation provided by the Blur Remover is still adequately accurate for obtaining good deblurring output.

2.5 Localized Parallax and Object Motion:

As noted above, either or both motion parallax and object motion between image frames results in local motion being inconsistent with global motion. In various optional embodiments, the Blur Remover addresses this issue by first identifying tagging specific areas of image where the local motion is not consistent with global motion.

In one embodiment, regions of any image pixel wherein the local motion is inconsistent with global motion are down-weighted. Note that a fixed amount of down-weighting may be used, with the maximum amount of down-weighting being used to remove the effect of those pixels on the deblurring process. In other words, given the maximum down-weighting, pixels with independent local motion will remain blurred. However, if the amount of down-weighting is decreased the effects of the corresponding pixels on the deblurring process will be increased, and some deblurring will be performed. However, it should be noted that in the case of large local motions or parallax, visible artifacts can be created by including these pixels in the deblurring process. Consequently, better results are generally obtained in such cases by using the down-weighting of pixels to remove or eliminate their contribution to the deblurring process.

In a similar approach, any pixels in regions where the local motion is inconsistent with global motion inherit blur estimation from nearby valid pixels (consistent motion). Given the inherited blur estimation, the Blur Remover then simply performs the iterative deblurring and refinement of optical flow. In particular, the initialization step remains the same as for fully motion consistent images. However, in the deblur step, the warping matrix incorporates per-pixel motion. Then, in the refinement step, the adjustment is to per-pixel motion. All other processes remain the same to construct the deblurred output images from the input image sequence.

Figure 5:
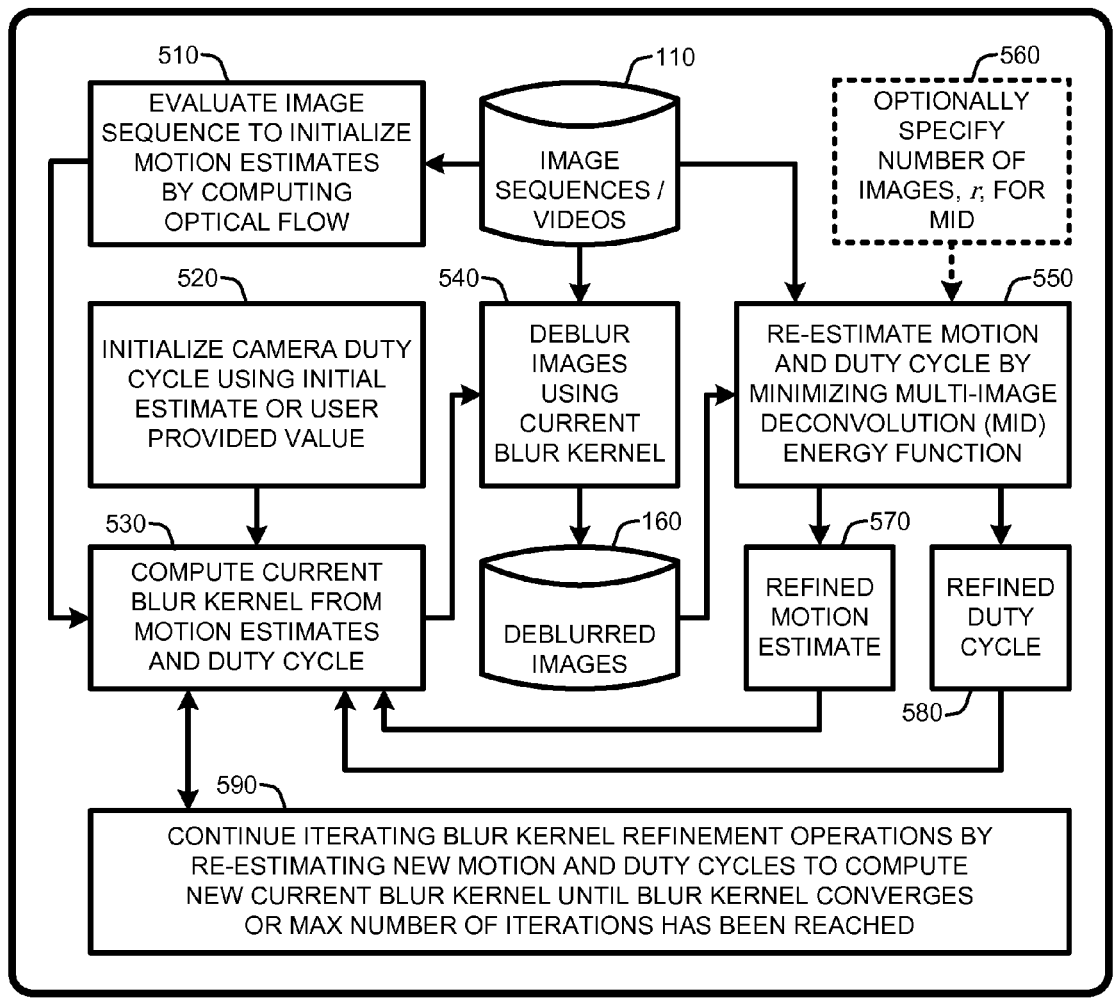
FIG. 5 illustrates a general system flow diagram that illustrates exemplary methods for implementing various embodiments of the Blur Remover, as described herein.

3.0 Operational Summary of the Blur Remover:

The processes described above with respect to FIG. 1 through FIG. 4 and in further view of the detailed description provided above in Sections 1 and 2 are further illustrated by the general operational flow diagram of FIG. 5. In particular, FIG. 5 provides an exemplary operational flow diagram that summarizes the operation of some of the various embodiments of the Blur Remover. Note that FIG. 5 is not intended to be an exhaustive representation of all of the various embodiments of the Blur Remover described herein, and that the embodiments represented in FIG. 5 are provided only for purposes of explanation.

Further, it should be noted that any boxes and interconnections between boxes that are represented by broken or dashed lines in FIG. 5 represent optional or alternate embodiments of the Blur Remover described herein, and that any or all of these optional or alternate embodiments, as described below, may be used in combination with other alternate embodiments that are described throughout this document.

In general, as illustrated by FIG. 5, the Blur Remover begins operation by evaluating 510 the image sequence or video 110 to initialize motion estimates for each frame by computing optical flow for each frame. Next, in combination with an initial estimate or user provided value of the camera duty cycle 520 (for the camera used to capture the image sequence or video 110) the Blur Remover computes 530 a current blur kernel.

The Blur Remover then acts to deblur 540 the images of the image sequence using the current blur kernel. The deblurred images 160 are then provided to an iterative process that first re-estimates 550 motion and duty cycle for each frame of the image sequence by minimizing the above-described multi-image deconvolution (MID) energy function. Note that the number neighboring images used for this MID process is optionally specified 560 via a user interface. The output of the re-estimation 550 process is a refined motion estimate 570 and a refined duty cycle 580. The iterative process then uses the refined motion estimate 570 and the refined duty cycle 580 to again compute 530 the current blur kernel from the motion estimates and the duty cycle.

The above described iterative processes, i.e.:
1. Deblur images 540 using the current blur kernel;
2. Re-estimate 550 motion 570 and duty cycle 580 from deblurred images 160;
3. Use refined motion 570 and duty cycle 580 values to compute current blur kernel;

then repeat until deblurring is complete. More specifically, the Blur Remover continues iterating 590 the blur kernel refinement operations by re-estimating new motion and duty cycles to compute a new current blur kernel until the blur kernel converges or, optionally, until a pre-determined maximum number of iterations has been reached. Then, once the iterative process is complete, the deblurred images 160 (created from the most current blur kernel) of the original image sequence or video 110 are provided as an output for whatever uses or further processing is desired.

Figure 6:
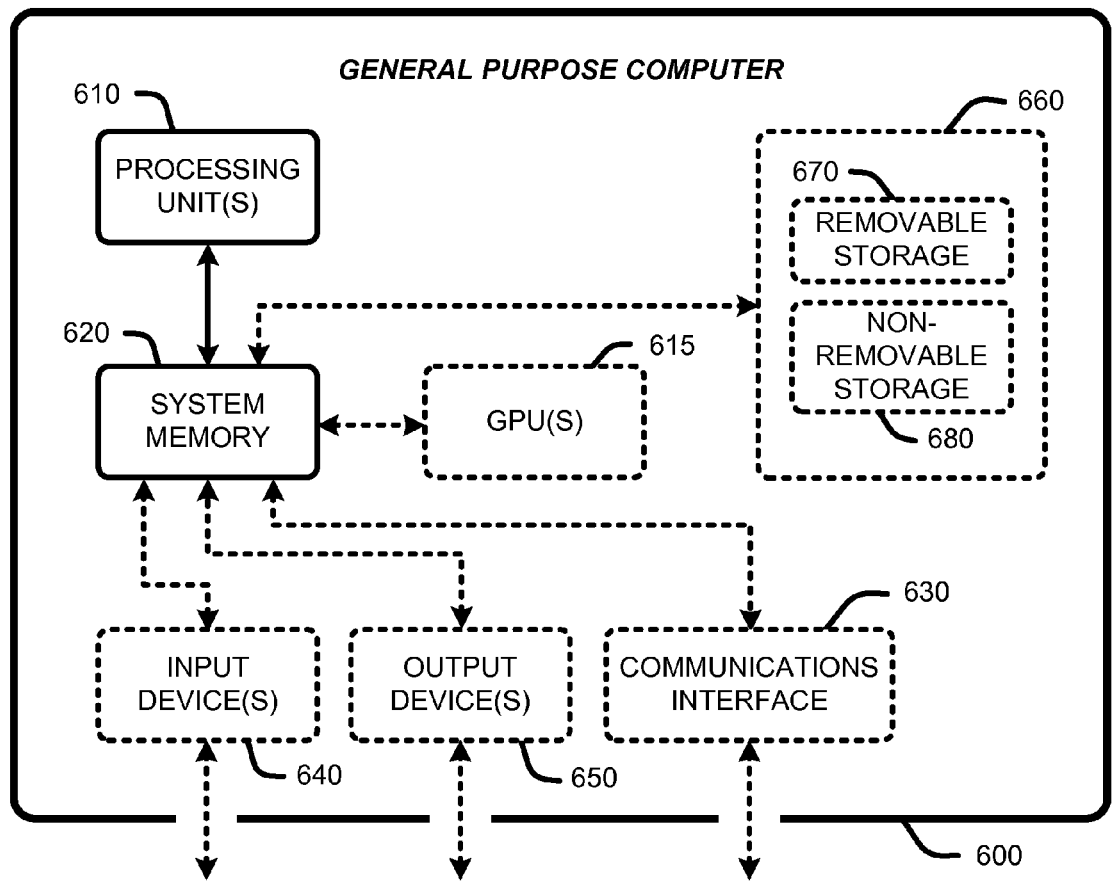
FIG. 6 is a general system diagram depicting a simplified general-purpose computing device having simplified computing and I/O capabilities for use in implementing various embodiments of the Blur Remover, as described herein.

4.0 Exemplary Operating Environments:

The Blur Remover described herein is operational within numerous types of general purpose or special purpose computing system environments or configurations. FIG. 6 illustrates a simplified example of a general-purpose computer system on which various embodiments and elements of the Blur Remover, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, video media players, etc.

To allow a device to implement the Blur Remover, the device should have a sufficient computational capability and system memory, and an ability to receive or capture a video stream either directly from a video camera, via an input device or interface (e.g., USB, IEEE 1394, etc.), via a communications interface, via a computer-readable media of some form, etc.

In particular, as illustrated by FIG. 6, the computational capability is generally illustrated by one or more processing unit(s) 610, and may also include one or more GPUs 615, either or both in communication with system memory 620. Note that the processing unit(s) 610 of the general computing device of may be specialized microprocessors, such as a DSP, a VLIW, or other micro-controller, or can be conventional CPUs having one or more processing cores, including specialized GPU-based cores in a multi-core CPU. In addition, it should also be noted that a cloud based computing scenario is also possible. In particular, rather than using local computing resources, such as the processing unit(s) 610 on the local computer, deblurring computations can be performed remotely as a "cloud" service separate from the other capture or user devices or processes described herein.

In addition, the simplified computing device of FIG. 6 may also include other components, such as, for example, a communications interface 630. The simplified computing device of FIG. 6 may also include one or more conventional computer input devices 640 (such as a digital camera, for example). The simplified computing device of FIG. 6 may also include other optional components, such as, for example, one or more conventional computer output devices 650. Finally, the simplified computing device of FIG. 6 may also include storage 660 that is either removable 670 and/or non-removable 680. Such storage includes computer readable media including, but not limited to, DVD's, CD's, floppy disks, tape drives, hard drives, optical drives, solid state memory devices, etc. Further, software embodying the some or all of the various embodiments, or portions thereof, may be stored on any desired combination of computer readable media in the form of computer executable instructions. Note that typical communications interfaces 630, input devices 640, output devices 650, and storage devices 660 for general-purpose computers are well known to those skilled in the art, and will not be described in detail herein.

The foregoing description of the Blur Remover has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Blur Remover. It is intended that the scope of the invention be limited not by this detailed description, but rather by the claims appended hereto.

What is claimed is:

1. A method for deblurring images in an image sequence, comprising steps for:
   receiving an input image sequence comprising a plurality of motion-blurred images;
   evaluating the image sequence to initialize motion estimates in each image by computing optical flow for each image;
   computing a current blur kernel from the motion estimates;
   generating a current set of deblurred images from the image sequence using the current blur kernel;
   until convergence of the current blur kernel is achieved, iteratively repeating steps for:
     using the current set of deblurred images to minimize a multi-image deconvolution energy function to produce refined motion estimates for each image of the input image sequence;
     computing a new current blur kernel from the refined motion estimates;
     generating a new current set of deblurred images from the image sequence using the new current blur kernel; and
     checking for convergence of the new current blur kernel relative to the immediately preceding blur kernel.

2. The method of claim 1 further comprising steps for estimating a current camera duty cycle via each iteration of minimizing the multi-image deconvolution energy function.

3. The method of claim 2 wherein the new current blur kernel at each iteration is computed as a joint function of the refined motion estimates and the current camera duty cycle estimate.

4. The method of claim 1 further comprising steps for specifying a number of sequential images to be used for the multi-image deconvolution energy function.

5. The method of claim 1 further comprising steps for generating a panoramic image from the input image sequence by adapting the multi-image deconvolution energy function to map deblurred images to a latent panoramic image with each iteration.

6. The method of claim 1 further comprising steps for terminating the iteratively repeated steps prior to convergence of the new current blur kernel once a predetermined number of iterations has been reached.

7. The method of claim 1 further comprising steps for correcting localized parallax effects in one or more of the images by performing steps for:
   identifying any pixels in regions of one or more of the images where local motion is inconsistent with global; and
   for pixels having inconsistent local motion, inherit motion estimates from nearby valid pixels having consistent motion for use in computing the new current blur kernel at each iteration.

8. The method of claim 1 further comprising steps for correcting localized parallax effects in one or more of the images by performing steps for:
   identifying any pixels in regions of one or more of the images where local motion is inconsistent with global motion; and
   for pixels having inconsistent local motion, down-weighting a contribution of these pixels to the iterative minimization of the multi-image deconvolution energy function.

9. A system for deblurring images in a motion-blurred image sequence, comprising:
   a device for evaluating a sequence of motion-blurred images to initialize motion estimates in each image by computing optical flow for each image;
   a device for computing a current blur kernel from the motion estimates and an initial camera duty cycle value;
   a device for generating a current set of deblurred images from the image sequence using the current blur kernel;
   a device for iteratively computing a new current blur kernel for use in deblurring the image sequence until convergence of the current blur kernel is achieved, comprising:
      using the current set of deblurred images to jointly minimize a multi-image deconvolution energy function to produce refined motion estimates for each image of the input image sequence in combination with a refined camera duty cycle value;
      computing a new current blur kernel from the refined motion estimates and the refined camera duty cycle value;
      generating a new current set of deblurred images from the image sequence using the new current blur kernel; and
      checking for convergence of the new current blur kernel relative to the immediately preceding blur kernel.

10. The system of claim 9 wherein the initial camera duty cycle value is specified via a user interface, and wherein, following the last iteration, the refined camera duty cycle value is provided as a final camera duty cycle.

11. The system of claim 9 further comprising generating a panoramic image from the input image sequence by adapting the multi-image deconvolution energy function to map deblurred images to a latent panoramic image with each iteration.

12. The system of claim 9 further comprising terminating the iterative refinement of the new current blur kernel and the camera duty prior to convergence of the new current blur kernel once a predetermined number of iterations has been reached.

13. The system of claim 9 further comprising a device for correcting localized parallax effects in one or more of the images by:
   identifying any pixels in regions of one or more of the images where local motion is inconsistent with global; and
   for pixels having inconsistent local motion, inherit motion estimates from nearby valid pixels having consistent motion for use in computing the new current blur kernel at each iteration.

14. The system claim 9 further comprising a device for correcting localized parallax effects in one or more of the images by:
   identifying any pixels in regions of one or more of the images where local motion is inconsistent with global motion; and
   for pixels having inconsistent local motion, down-weighting a contribution of these pixels to the iterative minimization of the multi-image deconvolution energy function.

15. A computer-readable memory having computer executable instructions stored therein for deblurring images, said instructions comprising:
   evaluating a sequence of motion-blurred images to initialize motion estimates in each image by computing optical flow for each image;
   computing a current blur kernel from the motion estimates and an initial camera duty cycle value;
   generating a current set of deblurred images from the image sequence using the current blur kernel;
   iteratively computing a new current blur kernel for use in deblurring the image sequence until convergence of the current blur kernel is achieved, comprising:
      using the current set of deblurred images to jointly minimize a multi-image deconvolution energy function to produce refined motion estimates for each image of the input image sequence in combination with a refined camera duty cycle value;
      computing a new current blur kernel from the refined motion estimates and the refined camera duty cycle value;
      generating a new current set of deblurred images from the image sequence using the new current blur kernel; and
      checking for convergence of the new current blur kernel relative to the immediately preceding blur kernel.

16. The computer-readable memory of claim 15 wherein the initial camera duty cycle value is specified via a user interface, and wherein, following the last iteration, the refined camera duty cycle value is provided as a final camera duty cycle.

17. The computer-readable memory of claim 15 further comprising generating a panoramic image from the input image sequence by adapting the multi-image deconvolution energy function to map deblurred images to a latent panoramic image with each iteration.

18. The computer-readable memory of claim 15 further comprising terminating the iterative refinement of the new current blur kernel and the camera duty prior to convergence of the new current blur kernel once a predetermined number of iterations has been reached.

19. The computer-readable memory of claim 15 further comprising correcting localized parallax effects in one or more of the images by:
- identifying any pixels in regions of one or more of the images where local motion is inconsistent with global; and
- for pixels having inconsistent local motion, inherit motion estimates from nearby valid pixels having consistent motion for use in computing the new current blur kernel at each iteration.

20. The computer-readable memory of claim 15 further comprising correcting localized parallax effects in one or more of the images by:
- identifying any pixels in regions of one or more of the images where local motion is inconsistent with global motion; and
- for pixels having inconsistent local motion, down-weighting a contribution of these pixels to the iterative minimization of the multi-image deconvolution energy function.

* * * * *